United States Patent Office 3,357,087
Patented Dec. 12, 1967

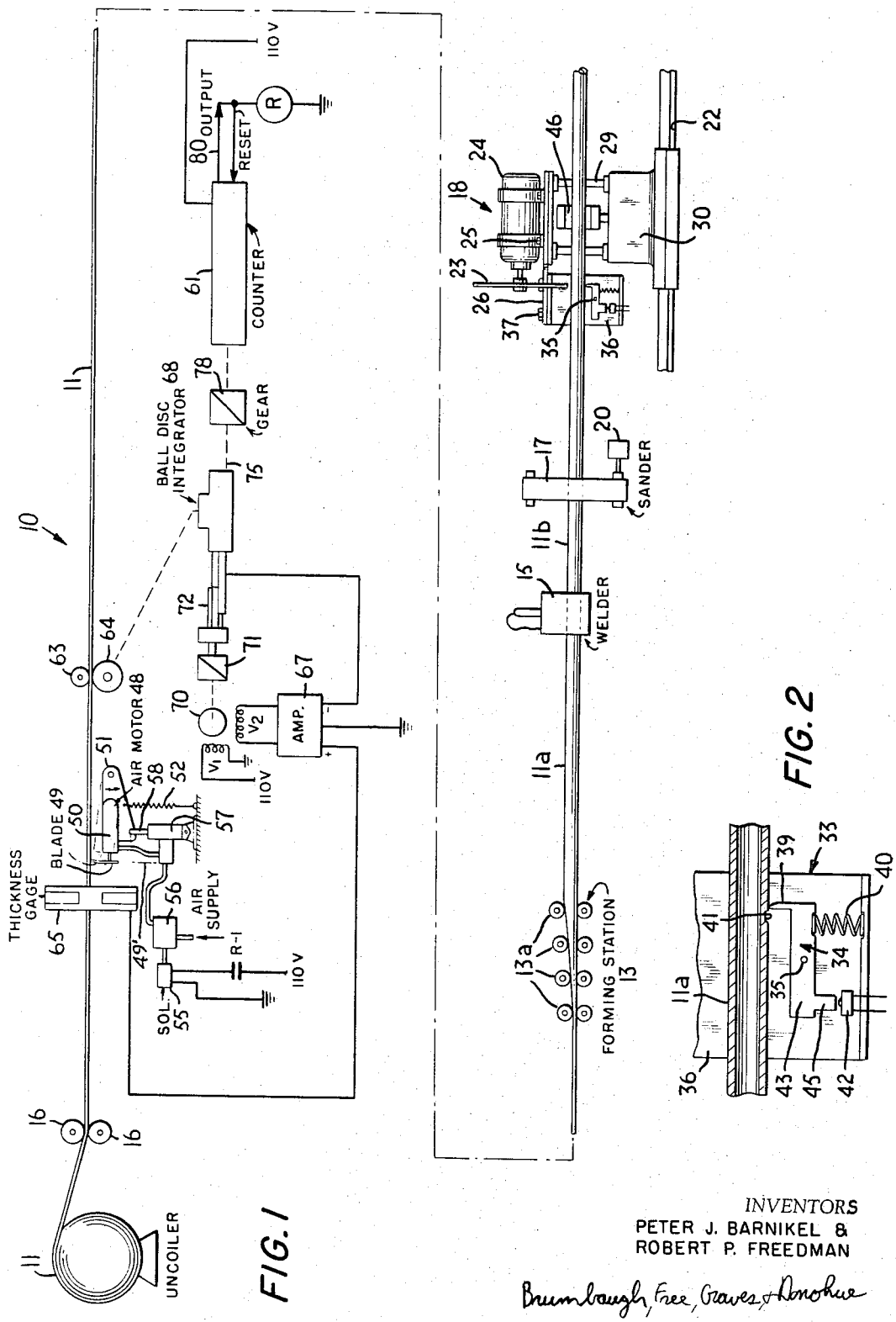

3,357,087
MASS FLOW COMPUTER AND CONTROL DEVICE
Peter J. Barnikel, New London, and Robert P. Freedman, Ledyard, Conn., assignors to General Dynamics Corporation, New York, N.Y., a corporation of Delaware
Filed July 21, 1965, Ser. No. 473,803
15 Claims. (Cl. 29—407)

The present invention relates to devices for continuously producing pipes, bars, and other articles. More particularly, the invention relates to a novel and improved arrangement for continuously severing individual lengths of pipe, or other articles, which all are of equal mass.

Often, where high quality pipe or bar stock is required to be formed with very accurate tolerances, the product is first fabricated or rolled to some semi-finished form. Thereafter, the product is finished by a separate operation which may include: cold drawing, flaring, expanding, swaging, spinning, or flattening.

In a process wherein the invention may be readily practiced, skelp is formed into a semi-finished pipe configuration. Ordinarily, the width of the cut skelp is accurate to two or three thousandths of an inch which, in relation to the total width, is negligible, whereas the skelp thickness may typically vary as much as 5% from some nominal gage or thickness value. Because of this fact, it will be understood that semi-finished pipe formed from skelp will have walls of varying thickness and the mass per unit length will vary essentially with the skelp thickness.

In forming pipe from skelp, the skelp is gradually curled up and formed into a tubular shape by a forming station embodied by form rolls or funnel-shaped dies. After passing this station, the continuously moving pipe is welded together, the weld bead sanded, and the pipe cut to length by a flying cutoff saw.

The semi-finished pipe, formed as described above, is thereafter drawn through a die and over a mandrel yielding a product with uniform thickness dimensions and a fine surface finish. Normally this pipe is sold at random lengths, i.e., a bundle of nominal 12-foot pipe might actually include lengths from 10 to 14 feet. Recently, user requirements have become more exacting and some purchases are based on specified as-drawn lengths. Pipes too short must be scrapped, and over-length pipes must be trimmed. Inasmuch as the semifinished pipe has walls of varying thickness, it is important that it be cut in units of constant mass, not length, to produce uniform lengths of finished pipe. Currently, semifinished pipes are cut an average of 5 to 8% over-length to insure that no under-length product is fabricated.

Accordingly, it is an object of the invention to eliminate losses, which have been characteristic of the prior art, in producing finished pipe from skelp.

Another object of the invention is to utilize the metal product as an indestructible memory signal for actuating a flying cutoff saw.

A still further object of the invention is to provide a relatively simple, inexpensive system for cutting articles of an equal volume, requiring a minimum use of parts for high speed operation.

These and other objects of the invention may be attained by employing the invention with the above-described process wherein skelp is formed into pipe. More particularly, sensing means may be provided to develop a plurality of signals representative of physical characteristics of the skelp as it passes a reference position in the process line. These signals may then control the operation of a device to develop an output signal representative of the mass of skelp which has passed the reference position. This output signal may then be compared with a predetermined value and a further signal developed at coincidence which causes an identification mark to be placed in the skelp at the reference position. Thereafter, the pipe is severed when the identification mark passes to and actuates the flying cutoff saw. All pipe lengths severed by this process will be of equal mass.

Further objects and advantages of the invention will be apparent from a reading of the following description in conjunction with the accompanying drawings, in which:

FIG. 1 is a schematic view of a typical device wherein skelp is formed into pipe, and wherein an embodiment of the invention may be practiced so that lengths of pipe are each cut to an equal mass of material; and FIG. 2 is an enlarged fragmentary view of FIG. 1 showing the details of an embodiment of the pickup mechanism for sensing the identification mark formed in the underside of the formed pipe, the pickup mechanism being adapted to actuate the flying cutoff saw.

In the process depicted in FIG. 1, measured and marked skelp 11 is passed to a forming station 13 where the skelp 11 is gradually curled up and formed into a tubular shape 11a. The forming station 13 may be embodied by several arrangements, for example, the illustrated form rolls 13a or funnel-shaped dies. After passing through the station 13, the continuously moving formed skelp 11a then passes on to a welder 15 wherein the edges of the tubular shaped product are finally welded together to form the pipe 11b. It will be understood that the device 10 includes conventional transporting means, illustrated by power rollers 16, for continuously delivering the skelp 11 from an uncoiler or reel through all the necessary manufacturing operations.

The welding process is accomplished by electric resistance welder 15, although it is understood that the welding process may be accomplished by other welding processes, for example, continuous butt-welding. It will be noted that if butt-welding is employed, then the edges of the skelp should be slightly beveled to provide a recess for the weld bead.

After passing through the welder 15, the pipe 11b is then passed through a sander 17 wherein the welded seam is cleaned and sanded smooth by a self-contained seam sander 17 which may be of a variety wherein sanding material is attached to an endless belt continuously driven by a motor 20. A short distance beyond the sander 17, the pipe 11b reaches a flying cutoff saw 18.

The flying cutoff saw 18 must move along the fixed ways 22 at substantially the same speed as the translating pipe 11b while it is severing a pipe length so that it does not interfere with the continuous process of forming the pipe 11b. After it has severed a length of pipe 11b, the saw 18 then must quickly be retreated back to its home position where it awaits the next cut. The means for providing this return are not shown but will be well understood to those skilled in the art.

The saw 18, provided with a conventional continuous rotary cutting blade 23, is driven by a motor 24. The motor 24 is bolted at 25 to a base plate 26 which in turn is mounted on a mechanism 29, of any standard variety, which permits the blade 23 to be presented to the pipe 11b so as to cut therethrough. During the severing operation, a sliding mount member 30 permits the saw 18 to advance along the fixed ways 22.

The signal for operating the saw 18 may be provided by a pickup mechanism 33 shown in FIG. 2 to include a lever member 34 pivoted at 35 on a channel 36 fastened by bolts 37 to the base plate 26. A sensing finger 39 and a compression spring 40 are provided at one remote end of the lever 34. The spring 40 urges the sensing finger 39 up into engagement with the underside of the pipe 11b passing thereover. Thus, if the finger 39 should sense an identification mark such as a notch or burr mark 41, it will pivot upwardly (in a counterclockwise sense) under the resilient urging of the spring 40 and actuate a switch 42 to energize the mechanism 29 commencing a pipe severing operation.

In juxtaposition to the end 43 of the lever 34 is the switch 42 which is adapted to be actuated by an extension portion 45 integrally formed on the end 43 of the lever 34. After actuation, just prior to the commencement of the severing operation, a saw clamp 46, shown in FIG. 1, is engaged and seizes the pipe 11b while the blade 23 is pivoted or presented downwardly by mechanism 29 so as to cut off the pipe 11b at the notched position 41. As the saw 18 pivots downwardly, the pickup mechanism 33 also mounted on the channel 36 moves with it out of engagement with the notch 41 so that it will not provide any interference for the saw blade 23.

By notching the skelp 11, the need for an electronic memory such as a register or a continuous magnetic tape to signal the saw 18 to sever a pipe length is obviated inasmuch as the notch 41 in the skelp 11 is an indestructible memory. Furthermore, the notch 41 permits the device 10 to be shut down indefinitely and then restarted without the loss of a single pipe length.

The means for providing the notch 41 in skelp 11 is an air motor 48, provided with a source of pressurized air, which operates small circular blade member 49 or other high speed cutter or grinder.

The motor proper 50, mounted upon a frame 51, pivoted at its remote end, is urged by tension spring 52 to a position whereby the blade 49 is normally disengaged from the bottom of the skelp surface. When the relay contacts R-1 operated by relay R are closed, a solenoid 55 is energized, opening a valve member 56 which permits pressurized air to be directed into a cylinder chamber 57 and to the motor proper 50 to drive the blade 49.

The cylinder chamber 57 is so arranged that when pressurized air is provided thereto, a piston member (not shown) having a rod 58 fixed to the bottom of the frame 51 rocks the frame 51 upwardly causing the rotating blade 49 to engage and cut a notch 41 in the undersurface of the passing skelp 11. Thereafter, when the contacts R-1 open, the solenoid actuated valve 56 closes, preventing any pressurized air from entering the motor proper 50 and the chamber 57. At this time, the spring 52 urges the frame member 51, and the motor proper 50 carried thereby, to its home position wherein the blade 49 is disengaged from the undersurface of the skelp 11.

A plane defined by the front surface of the blade 49 can be considered to define a reference position 49' in relation to a sensing station wherein the physical characteristics of the skelp 11 are measured. The sensing station actually includes a pair of pressure rollers 63 and 64 and a thickness gage 65 located before the forming station 13 but after the power rollers 16. The thickness gage 65 senses the thickness of the skelp 11 and delivers a voltage signal, indicative of the skelp thickness, as an input to an amplifier 67. The thickness gage 65 should desirably provide a continuous measurement. Such a gage may be a contacting gage, i.e., Pratt & Whitney's "Electrolimit" or a non-contacting gage such as an X-ray gage or "Dimensionaire" gage manufactured by Federal Products Corporation.

Another voltage signal provided to the amplifier 67 comes from a ball disc integrator mechanism 68 moving a tap on a potentiometer (not shown) so as to provide a voltage signal in series opposition to the voltage developed by the thickness gage 65. No voltage is actually amplified in the amplifier 67 when both supplied voltages are equal. When the thickness gage develops a deviation signal, however, the difference between the voltages is amplified and used to control a reversible motor 70 driven in one direction when the deviation signal is positive and in the other direction when it is negative. The amplifier 67 includes the necessary circuitry to convert the direct current inputs to an alternating current output when an alternating current control motor 70 is used.

The motor 70 is a two-phase induction motor operated by the voltage V1 (provided by a constant 110 volt alternating current voltage source) and the voltage V2, the control voltage supplied from the output of the amplifier 67. It will be understood, however, that the motor 70 need not necessarily be of an alternating current variety inasmuch as a direct current control motor could also be readily employed.

There is, of course, some delay between the time at which the thickness gage 65 measures the skelp 11 and when any given measured position of skelp passes the reference position 49'. Inasmuch as reference position 49' is in juxtaposition to the thickness gage 65, for most applications the gage 65 can be considered to be located at the reference position 49'.

The motor 70 is mechanically coupled by a gearbox 71 to a lead screw 72 which positions the ball of the integrator 68 indicating a change in the thickness of the skelp 11. At the same time, the lead screw 72 is moved in a direction to produce a voltage signal in opposition to the voltage signal developed by the gage 65 such that, when the voltage inputs are equal, the output signal from the amplifier 67 is reduced to zero and the ball of the integrator 68 will be correctly positioned.

The input to the disc of integrator 68 is from a mechanical connection with the roll 64. The pressure roll 63 cooperating with the roll 64 insures that the roll 64 is in firm contact with and rotated by the motion of the passing skelp 11. This rotational movement of the roll 64 is indicative of the length of skelp passing the reference position 49' inasmuch as, in any given period of time, after the first pipe length is severed, the same length of skelp 11 which passes the roll 64 will also pass the reference position 49'. Also, roll 64 may be included in the framework of gage 65 to give closer spacing.

If the above-described arrangement is carefully constructed, and the amplifier gain high, only a small difference voltage of the order of a few millivolts or less is required to produce perceptible deflection in the control motor 70 which thereby affects the integration process by way of the lead screw 72.

The integrator 68 is of a conventional ball-disc design wherein the input from the roll 64 is adapted to drive the disc and the lead screw 72 is adapted to position the ball. By utilizing the mechanical integrator 68, highly accurate output can be achieved. Further, the use of ball disc integrator 68 in conjunction with mechanical counter 61 permits intermittent start-up and shut-down of the line without loss of count or introduction of error. Still further, the ball-disc integrator probably provides the least expensive means of performing the integrating function. In any event, it will be understood that the integration function could be performed with not only other types of mechanical integrators but with electromechanical integrators or with electronic integrators as well.

Rotation of the integrator output shaft 75, only the axis of which is shown, is proportional to the integral of the product of the skelp thickness and length, or, in other words, provides a continuous signal representative of the longitudinal cross-sectional area of the skelp 11, passing the reference position 49'. The shaft 75 is coupled by a gearbox 78 to the counter 61. Torque amplifiers or a servo follow-up arrangement may be employed in conjunction with shaft 75 when the variety of the counter 61 employed operates most effectively with same.

The mass of any length of skelp 11 can be determined by multiplying the volume of that skelp by its density. A computer with inputs representative of the skelp width and density could keep a running account of the mass of skelp passing the reference position. However, inasmuch as for most applications the skelp 11 can be considered to be of uniform density, and the width of skelp 11 considered substantially constant, a computer need only totalize the longitudinal cross-sectional area of skelp 11 passing the reference position 49'.

Specifically, the counter 61, which may be embodied by any of a number of commercial varieties, mechanical, electromechanical or electronic, converts the rotational movement of the shaft 75 to a cumulating total. A comparator section of the counter 61 when the totalizing number is equal to or coincident with a predetermined number, representative of a predetermined mass, produces a signal upon line 80 which energizes relay R and provides a feedback reset signal to the counter 61. After a predetermined time delay necessary to permit the notch 41 to be cut in the skelp 11, the feedback signal causes the counter 61 to reset its held count to zero and removes the signal from the line 80 which causes the relay R to de-energize. Relay R may, for example, be of a commercial delay-on-break type.

Reviewing, the invention when employed with a process wherein skelp is formed into pipe, comprehends the provision of a sensing station wherein two signals are simultaneously developed, one representative of skelp thickness and the other representative of skelp length. The thickness signal, developed by the gage 65 in the form of a voltage signal, is applied as an input to the amplifier 67. The integrator 68 provides another voltage signal, in series opposition to the voltage from the gage 65, as an input to the amplifier 67. The arrangement is such that when the gage 65 develops a signal indicating a change in skelp thickness, the difference between the voltage inputs to the amplifier 67 is amplified and used to drive the reversible control motor 70 which positions the lead screw 72. The lead screw 72 moves in a direction to vary the voltage from the integrator 68 until it equals the voltage from the gage 65. At this point in time the ball of the integrator 68 will be correctly positioned indicating the thickness of the skelp 11 at the reference position 49'.

The signal representative of skelp length is developed by the roll 64 as it drives the disc of the integrator 68 indicating the length of skelp 11 passing the reference position 49'. The mechanical integrator 68 provides a continuous input to the counter 61 which keeps a running total of the mass of skelp passing the reference position 49' and is arranged to energize the relay R when the mass passing the reference position 49' equals some predetermined value. The energized relay R then actuates the air motor 48 which cuts a notch or identification mark 41 in the skelp 11 at position 49'. Thereafter, when the pickup mechanism detects the notch 41, it signals the flying cutoff saw 18 to sever the pipe 11b at the notched position.

Broadly speaking, the invention discloses an arrangement for the manufacture of articles of equal mass or volume. The invention provides sensing means to develop a plurality of signals representative of physical characteristics of the material forming the article passing a reference position. These signals are connected as inputs to a device which is adapted to produce a coincidence signal when a predetermined quantity of mass or volume of material has passed the reference position. The coincidence signal causes a mark to be placed upon the article which indicates the position where the article is to be cut to length.

Thus it will be understood by those skilled in the art that the above-described embodiment is meant merely to be exemplary and that it is susceptible to modifications and variations without departing from the spirit and scope of the invention. Therefore, all such variations and modifications are included within the scope of the invention as set forth in the appended claims.

We claim:

1. A process for the manufacture of articles, each of a substantially equal volume comprising the steps of transporting a product to a forming station wherein the product is shaped into an article, severing the formed article to length after recognition of an identification mark indicating the length of the article to be severed, said mark being provided in the following manner: sensing the product to develop a plurality of signals representative of characteristics of the product passing a reference position, said signals when integrated being representative of the volume of said product, integrating the characteristic signals to develop a signal, and totalizing the integrated signal and comparing the total against a predetermined number representative of the desired volume to generate the identification mark after coincidence.

2. A process as claimed in claim 1, wherein the comparing step includes the step of placing a notch identification mark in the product at the reference position.

3. A process as claimed in claim 2, wherein the integrated signal is representative of the longitudinal cross-sectional area of the product.

4. A process for the manufacture of pipe lengths each of substantially equal volume from skelp of substantially constant width comprising the steps of transporting the skelp to a forming station wherein the skelp is shaped into pipe, severing the formed pipe to length after recognition of an identification mark indicating the length to be severed, said mark being provided in the following manner: sensing the thickness of skelp to derive a signal representative of the skelp thickness passing a reference position and sensing the skelp to develop a signal representative of the length of skelp passing the reference position, integrating the representative signals to develop an input signal for a counter, totalizing the input signal, comparing the cumulating total input signal against a predetermined number representative of the desired volume of skelp and generating a signal at coincidence and forming the identification mark upon recognition of the coincidence signal by cutting a memory notch in the skelp at the reference position.

5. A process as claimed in claim 4, wherein the process is for the continuous manufacture of pipe lengths and includes the steps of welding the skelp edges to form pipe and sanding the weld seam of the formed pipe.

6. A process for the continuous manufacture of pipe lengths each of a selected mass from metal skelp of a substantially uniform width and constant density comprising the steps of transporting the skelp to a forming station wherein the skelp is curled into a tubular configuration, welding the edges of the curled skelp to form pipe and sanding the weld seam of the formed pipe, severing the formed pipe to lengths after recognition of a notch cut in the skelp, said notch being provided in the following manner: sensing the skelp to develop a signal representative of the thickness of skelp and a signal representative of the length of skelp passing a reference position, integrating the representative signals to develop an input signal for a counter representative of the longitudinal cross-sectional area of the skelp passing the reference position, totalizing the longitudinal cross-sectional area of skelp passing the reference position and comparing the cumulating total against a predetermined number indicative of the selected mass of skelp and developing a signal at coincidence and notching the skelp at the reference position upon actuation by the coincident signal.

7. A process as claimed in claim 6, wherein the severing step includes the steps of sensing the formed pipe to detect the notch and cutting the pipe at the notched position after detection.

8. A device for the continuous manufacture of pipe lengths each of an equal mass from metal skelp of substantially uniform width and constant density comprising a forming station for curling the skelp into a tubular configuration, welding means for joining the curled skelp edges to form pipe, a flying cutoff saw for cutting pipe lengths of the selected mass without interfering with the manufacture of pipe lengths including severing means for cutting the pipe to length, means for urging the severing means to a position disengaged from the pipe and a pick up mechanism actuated by recognition of a notch in the pipe for causing the severing means to engage and sever the pipe, said notch being provided by the following arrangement: a sensing station defining a reference position comprising means for sensing the skelp to develop a plurality of signals representative of physical characteristics of the skelp, has been inserted after the comma tics of the skelp, said signals when integrated being representative of the mass of the skelp, means for integrating the signals, means for totalizing the integrated signals and means for generating a signal when the cumulating total coincides with a predetermined number representative of the desired mass of skelp and means actuated by the coincidence signal for providing a notch in the skelp at the reference position.

9. The sensing station of claim 8, wherein the notching means includes a driven blade normally urged to a position disengaged from the skelp and means for presenting the blade to the skelp to notch the skelp upon recognition of the coincidence signal.

10. The sensing station of claim 8, wherein the integrating means is a ball-disc integrator and wherein the sensing means provides inputs to the integrator representative of the skelp thickness and length whereby the integrated signal is representative of the longitudinal cross-sectional area of the skelp passing the reference position.

11. The sensing station of claim 8, including amplifier means providing an input to the integrating means for indicating a change in the thickness of the skelp passing the reference position and wherein the sensing means provides a signal to the amplifying means representative of the thickness of the skelp and a signal to the integrating means representative of the length of skelp passing the reference position.

12. The sensing station of claim 11, wherein the integrating means is a mechanical ball-disc integrator and wherein the amplifying means includes a control motor having a shaft providing an input to the integrator.

13. A device according to claim 8 wherein the pickup mechanism includes a lever having a notched sensing finger, means for urging the finger into engagement with the pipe and switch means actuated by the lever when the sensing finger detects a notch for actuating the severing means to sever the pipe at the notched position.

14. A device for the continuous manufacture of pipe lengths each of an equal mass from metal skelp of substantially uniform width and constant density comprising a forming station for curling the skelp into a tubular configuration, welding means for joining the curled skelp edges to form pipe, sanding means for smoothing and cleaning the weld seam of the formed pipe, a flying cutoff saw for cutting pipe lengths of the selected mass without interfering with the manufacture of pipe lengths including severing means for cutting the pipe to length, means for urging the severing means to a position disengaged from the pipe and a pickup mechanism actuated by recognition of a notch in the pipe for causing the severing means to engage and sever the pipe, said notch being provided by the following arrangement: a sensing station defining a reference position, means for sensing the skelp to develop a plurality of signals representative of thickness and length of skelp passing the reference position, means for integrating the signals to develop a signal representative of the longitudinal cross-sectional area of skelp passing the reference position as an input for a counter, a counter, said counter including means for totalizing the input signal and means for generating a signal when the cumulating total signal coincides with a predetermined number representative of the desired mass of skelp, means actuated by the coincidence signal for providing a notch in the skelp at the reference position including a driven blade normally in a position disengaged from the skelp and means for presenting the blade to the skelp to notch the skelp after actuation by the coincidence signal.

15. A device according to claim 14 wherein the pickup mechanism includes a lever having a notched sensing finger, means for urging the finger into engagement with the pipe and switch means actuated by the lever when the sensing finger detects a notch for actuating the severing means to sever the pipe at the notched position.

References Cited
UNITED STATES PATENTS

| | | | |
|---|---|---|---|
| 2,444,463 | 7/1948 | Nordquist | 228—13 |
| 2,444,465 | 7/1948 | Peters | 228—13 |
| 3,193,170 | 7/1965 | Pozsgay | 228—8 |

JOHN F. CAMPBELL, *Primary Examiner.*

M. L. FAIGUS, *Assistant Examiner.*